June 28, 1966     R. K. VIRGIL     3,258,001
POWERED CHARCOAL GRILL

Filed Sept. 27, 1962     2 Sheets-Sheet 1

INVENTOR.
RICHARD K. VIRGIL
BY
Eugene C. Knoblock
ATTORNEY

June 28, 1966  R. K. VIRGIL  3,258,001
POWERED CHARCOAL GRILL
Filed Sept. 27, 1962  2 Sheets-Sheet 2
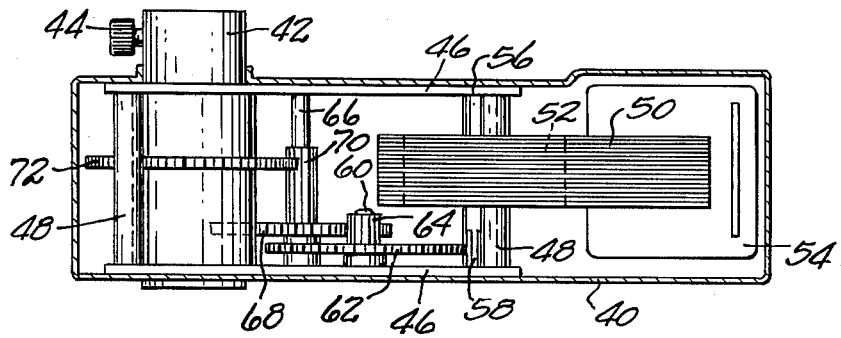
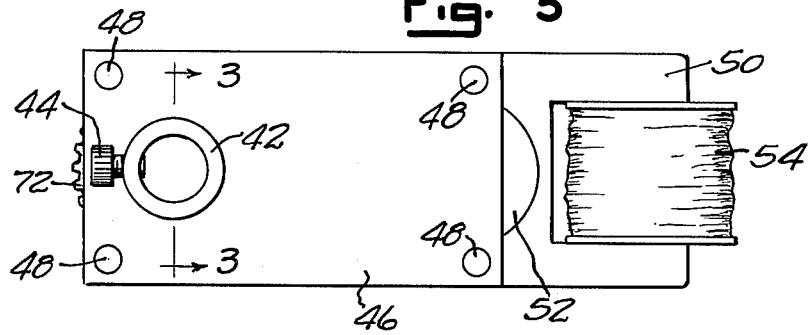
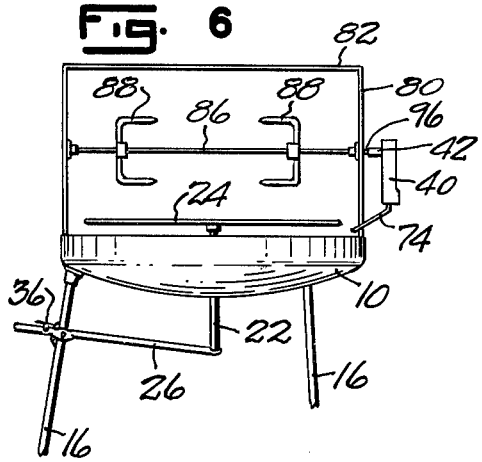
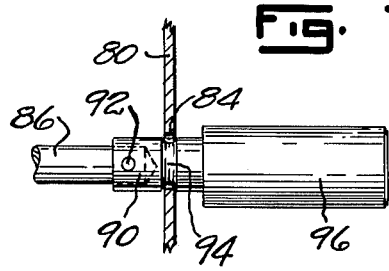
INVENTOR.
RICHARD K. VIRGIL
BY
Eugene C. Knoblock
ATTORNEY

United States Patent Office 3,258,001
Patented June 28, 1966

3,258,001
POWERED CHARCOAL GRILL
Richard K. Virgil, R.R. 1, Cassopolis, Mich.
Filed Sept. 27, 1962, Ser. No. 227,122
4 Claims. (Cl. 126—25)

This invention relates to charcoal grills and more particularly to an outdoor charcoal grill for cooking purposes, such as broiling or grilling meat.

Devices of this character are commonly characterized by a pan-type carrier for charcoal mounted in elevated position upon a support and having a central rotatable shaft carrying a grill, said shaft being positioned at selected elevation by suitable adjusting means which regulate the height of a grill carrying meat relative to the level of a bed of burning coals. While the grill is rotatable, it normally remains stationary unless it is manually turned, and in usual practice the constant attention required for adequate and properly timed rotation is seldom given. In view of the lack of adequate rotation, it is customary to apply burning coal throughout the container with the result that excessive coal is used and excessive heat is generated. This leads to burning of the meat, particularly as a result of the flashing of flames resulting from the dripping of fat upon the burning coals.

I have found that if the grill is rotated constantly at low speed and a fire is limited to one section only of the pan beneath the grill, the occurrence of flash fires from melted fats is substantially reduced and with it is reduced the likelihood of burning of the food. Thus it is possible to secure good cooking results with limited attention by the operator.

The primary object of this invention is to provide a novel, simple, inexpensive and readily applicable means for rotating a cooking grill.

A further object is to provide a motor drive unit which is readily applicable to a shaft to be rotated thereby so as to make possible ready conversion of conventional charcoal grills from manual rotation to powered rotation.

Other objects will be apparent from the following specification.

In the drawings:

FIG. 4 is a side view of a motor or power member with its casing shown in cross-section;

FIG. 5 is a top plan view of a motor with the casing removed;

FIG. 6 is a fragmentary side view of a grill having a rotisserie and illustrating my improved driving means applied to actuate the rotisserie;

FIG. 7 is an enlarged fragmentary view illustrating the end of the rotisserie shaft upon which the drive motor is mounted.

Figure 1:
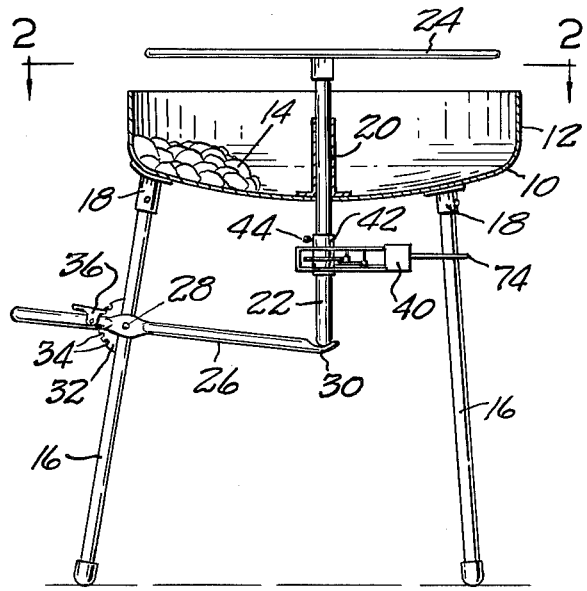
FIG. 1 is a view of a charcoal grill having my drive means applied thereto, with parts of the grill being shown in section.

Referring to the drawings, and particularly to FIGS. 1 to 5 which illustrate one embodiment of the invention, the numeral 10 designates a pan or container having shallow side walls 12 and open at its top. The container is adapted to contain charcoal 14 which is ignited to provide heat for cooking purposes, as well understood in the art. The container 10 is mounted in elevated position upon a suitable supporting structure, such as legs 16, fixedly connected at their upper ends to the container 10 as by sockets 18.

At its center the container 10 has an opening which is outlined by a vertical tube 20 welded or otherwise suitably secured to the bottom of the container and projecting upwardly to an elevation preferably above the level at which coal is used in the container. An elongated grill shaft 22 is journaled and axially slidable in the tube 20. At its upper end the grill shaft 22 mounts a grill 24 of any suitable construction, preferably consisting of a structure formed of steel wire and capable of providing support for meat and other food. The grill 24 may be of any construction well understood in the art, mounted upon the upper end of the shaft 22 and capable of rotating therewith.

Means are provided for adjusting the vertical position of the grill shaft 22 and the grill 24. One such means is here illustrated in the nature of an elongated rigid lever arm 26 pivoted intermediate its ends at 28 to the supporting structure, such as a leg 16. At one end the lever 26 is configured in cup-shape or socket form at 30 to engage the lower end of the shaft 22 which preferably is rounded to accommodate minimum friction and resistance to rotation of the shaft 22 as its end bears upon the lever end 30. Suitable means are provided to adjust the position of the lever 26 and such means are here illustrated as a quadrant or semi-circular member 32 notched at 34 at spaced intervals along its circular edge and engageable by a pawl or detent 36 pivoted upon the outer free end of the lever 26 and suitably spring-urged toward a locking position seated in a selected one of said notches 34.

My improved drive means comprises an electric motor having a gear train for reducing speed and driving a collar or sleeve rotatably, which collar or sleeve may be detachably clamped on the grill shaft 22. In the form illustrated, the drive unit is enclosed within a casing or housing 40 through which the driving sleeve 42 extends, said sleeve being open at its opposite ends so that it may receive the grill shaft 22 and assume any selected position thereon. A set screw 44 or any other selected means may be utilized to detachably clamp the unit at selected position upon the shaft 22.

The housing 40 encases a motor which preferably has a frame consisting of spaced frame plates 46 interconnected by studs or spacers 48. The frame mounts a laminated stator 50 having an aperture therein rotatably receiving a rotor 52 and being notched adjacent to the stator opening to provide means for mounting a motor coil structure 54. Rotor 52 has a shaft 56 journaled in the plates 46 and at one end having gear tooth forming kerfs 58 therein defining a pinion.

A plurality of shafts and studs are carried by the frame, thus one stud shaft 60 mounts a gear 62 meshing with the pinion 58 and a reduced pinion 64. Another shaft 66 journaled in the frame plates 46 carries a gear 68 meshing with the pinion 64 and in turn has a pinion 70. Still another gear 72 meshes with the pinion 70, the same preferably being mounted upon the rotatable sleeve 42. It will be understood that the number of gears and pinions and their positioning and their ratios may vary so that the sleeve 42 is caused to rotate at any selected speed. Thus the particular gear train here illustrated is illustrative and is not intended to be limiting, it being understood that any type of speed reducer found suitable may be employed in the device interposed between the motor rotor and the driving sleeve 42.

The sleeve 42 will have an inner diameter large enough to accommodate slidable mounting therein of shaft 22 of the character usually employed in charcoal grills. Thus the device can be mounted upon any conventional grill by the simple expedient of elevating the shaft 22 in the sleeve 20 sufficiently to provide clearance with its supporting socket 30 adequate to permit drive sleeve 42 to be aligned with the elevated lower end of the shaft 22 so as to accommodate interfitting of the shaft and sleeve, as illustrated in FIG. 1. The set screw 44 or other locking means can then be manipulated to lock the sleeve 44 upon the shaft 22 at any selected elevation and preferably at an elevation spaced below the bottom of the container 10 and above the shaft support 26, 30. The installation is completed by providing a motion-retarding connection between the power unit and the grill, as at a leg 16 thereof. The motion-retarding means is here designated 74 and may constitute a chain, a cable, an arm or any other suitable structure connected to the housing 40 of the power unit and engaging a stationary part of the grill structure, such as a leg 16, in such a manner as to prevent rotation of the power unit. Thus it will be apparent that with the power unit held at a selected stationary rotative position, for example that illustrated in FIG. 2, rotation of the sleeve 42 will serve to rotate the shaft 22 and the grill 24, when the motor is energized by suitable electric connection with a source of current, as well understood in the art. The motion retarding means 74 will preferably be flexible or adaptable so that it will be effective while at the same time accommodating adjustment of the elevation of the motor 40 incident to raising and lowering of the shaft 22 and the grill 24 for proper cooking purposes.

Figure 2:
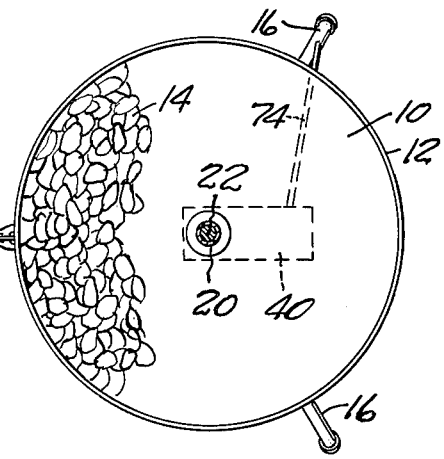
FIG. 2 is a horizontal sectional view taken on line 2—2 of FIG. 1.
Figure 3:
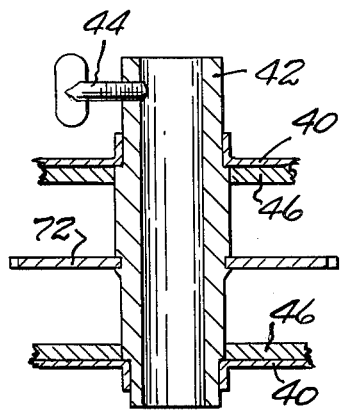
FIG. 3 is an enlarged vertical fragmentary sectional view taken on line 3—3 of FIG. 5.

By virtue of the provision for constant low speed rotation of the grill and the food carried thereby, it is possible to limit the location of coals 14 to a fractional portion of the container 10, as illustrated in FIGS. 1 and 2, so that some of the area of the bottom of the container is exposed and may be covered with an absorbent material, such as fuller's earth. Thus the meat is subjected periodically to cooking heat and to location above an unheated area. Thus as fats drip from the meat during cooking, the risk of flash flames is reduced to the extent that a portion of the bottom of the container is not covered with burning coals. The constant movement of the rotor serves to insure uniformity of cooking of all meat or other food upon the grill, and safer more economical grill operation with minimum risk of burning of the food and minimum requirement for attendance on the grill is involved.

Some cooking grills include a rotisserie, as illustrated in FIG. 6. In such constructions, a hooded portion fits upon the container 10, the same preferably having a part-cylindrical wall 80 and a part-circular top wall 82, said hood usually being substantially of semi-circular shape so as to leave open a space through which convenient access to both the grill 24 and a rotisserie unit may be had, and so as to insure adequate air supply for combustion of coals 14 in the container 10. In such constructions, it is common to provide diametrically opposed openings 84 in the part-cylindrical wall 80 to journal a rotisserie shaft 86 mounting thereon spaced food carriers 88 in the manner well understood in the art. It is conventional to provide a crank or other operating means for rotating the rotisserie shaft 86. I have found that it is possible to provide a motor drive for the rotisserie shaft 86 by providing an end fitting or fixture mounted upon the shaft 86 and projecting externally of the hood 80. Thus, as illustrated in FIG. 7, an elongated stepped cylindrical member having a socket end portion 90 with a detachable connection with the shaft 86, as by means of a cross-pin 92, may be utilized. The socket 90 is preferably cylindrical and of a diameter to pass through the aperture 84 with clearance and preferably has a groove 94 therein registering with the recess and permitting releasable rotatable connection of the socket 90 with the apertured wall 80 by virtue of fitting of the lowermost portion of the groove upon the wall 80 at the bottom of the aperture 84. The fitting has an enlarged cylindrical outer end part 96 of any selected diameter and preferably of a diameter substantially equal to the diameter of a grill shaft 22.

My improved drive unit is mounted upon the external enlarged shaft for fitting portion 96 by sliding of the sleeve 42 thereon and clamping of the sleeve on the fitting by means of the set screw or other connection means 44. Motion retarding means 74, such as a cable, a chain or a projecting arm carried by the housing 40 of the drive unit and engaging a fixed part of the grill, such as an edge of the hood 80, complete the construction. Thus it will be seen that detachable mounting of the drive member to rotate a rotisserie as well as to operate a rotatable grill may be accomplished with minimum trouble.

In both of the embodiments of the invention here illustrated, namely the embodiment in which the grill is driven and the embodiment in which the rotisserie is driven, the device is characterized by ease and rapidity of attachment and detachment, adaptability to a wide range of constructions of grills, making it possible to convert conventional grills to a power drive quickly and inexpensively and, further, are characterized by a simple low cost construction, sturdily built and substantially trouble-free in operation. It will also be apparent that the power unit may be used for driving the shaft of an article different from a grill.

While the preferred embodiments of the invention have been illustrated and described, it will be understood that changes in the construction may be made within the scope of the appended claims without departing from the spirit of the invention.

I claim:
1. A charcoal grill comprising
 a support means,
 a fuel container mounted on said suport means,
 an upright shaft journaled in said container and shiftable axially,
 a grill carried by said shaft,
 means on said support means for axially positioning said shaft,
 a power driven unit connected to and supported by said shaft, and
 means connected to said unit and engageable with said support means for positioning said unit,
 said unit including a tubular member encircling said shaft and detachably secured to said shaft, said shaft and means for axially positioning said shaft are the sole means supporting the weight of said unit.

2. A charcoal grill comprising
 a support means,
 a fuel container mounted on said support means,
 an upright shaft journaled in said container and axially shiftable,
 a grill carried by said shaft,
 means on said support means for axially positioning said shaft,
 a power driven unit connected to and supported by said shaft,
 means connected to said unit and engageable with said support means for positioning said unit,
 said unit including
 an electric motor,
 a speed reducer driven by said motor,
 a tubular rotatable member encircling said shaft and drivingly connected to said speed reducer, and
 means releasably locking said tubular member on said shaft, said shaft and means for axially positioning said shaft are the sole support for said unit.

3. A charcoal grill comprising
 a support means,
 a fuel container mounted on said support means,
 an upright shaft journaled in said container and axially shiftable,
 a grill carried by said shaft,
 means on said support means for axially positioning said shaft,
 a power driven unit connected to and supported by said shaft below said container,
 means connected to said unit and engageable with said support means for retarding rotation of said unit,
 said unit including a power driven rotatable tubular member encircling said shaft, and means drivingly connecting said tubular member and shaft, whereby the weight of said unit is supported solely at said shaft and said means for axially positioning said shaft.

4. A charcoal grill comprising a support means, a fuel container mounted on said support means, an upright shaft journaled in said container and shiftable axially, a grill carried by said shaft, means on said support means for axially positioning said shaft, a power driven unit connected to and supported by said shaft, means connected to said unit and engageable with said support means for positioning said unit in selected location relative to said support means and container, said unit including a power driven rotatable tubular member encircling and slidable on said shaft, and a set screw on said tubular member for clamping engagement with said shaft whereby the weight of said unit is supported solely at said shaft and said means for axially positioning said shaft.

References Cited by the Examiner

UNITED STATES PATENTS

| | | | |
|---|---|---|---|
| 1,552,854 | 9/1925 | James | 126—338 X |
| 2,498,957 | 2/1950 | Jordan | 343—766 X |
| 2,502,239 | 3/1950 | Wallach | 310—66 X |
| 2,819,667 | 1/1958 | Victor | 126—25 |
| 3,033,189 | 5/1962 | Clark | 126—25 |
| 3,033,190 | 5/1962 | Atkinson | 126—25 |

FREDERICK L. MATTESON, JR., *Primary Examiner.*

PERCY L. PATRICK, JAMES W. WESTHAVER, ROBERT A. O'LEARY, *Examiners.*

V. M. PERUZZI, E. G. FAVORS, *Assistant Examiners.*